United States Patent [19]

Cartaud et al.

[11] Patent Number: 4,952,198
[45] Date of Patent: Aug. 28, 1990

[54] TENSIONER FOR POWER TRANSMISSION BELT

[75] Inventors: Maurice Cartaud; Guy Blut, both of Vierzon, France

[73] Assignee: Hutchinson, Paris, France

[21] Appl. No.: 365,455

[22] Filed: Jun. 13, 1989

[30] Foreign Application Priority Data

Jun. 14, 1988 [FR] France .................... 8807897

[51] Int. Cl.⁵ .............................................. F16H 7/08
[52] U.S. Cl. ..................................... 474/138; 474/110
[58] Field of Search .................... 474/101, 109–111, 474/113, 117, 136, 138; 267/140.1

[56] References Cited

U.S. PATENT DOCUMENTS 4,773,892 9/1988 Zarife et al. .................. 474/138

FOREIGN PATENT DOCUMENTS 0243237 10/1987 European Pat. Off.
1260067 3/1961 France .
2451511 10/1980 France .

Primary Examiner—Thuy M. Bui
Attorney, Agent, or Firm—Browdy & Neimark

[57] ABSTRACT

A tensioner is provided for a power transmission belt comprising at least one return spring associated with the shaft of a tensioning roller with which the belt cooperates for controlling the displacement of said roller under the action of said spring, and two variable volume chambers each defined by an elastomer sheath, filled with a liquid and communicating with each other at one of their ends through a valve device through which the liquid flows into or out of said chambers and which introduces a damping effect of the vibrations likely to occur in the belt, wherein said sheath and a first spring portion associated with one of the chambers are fast with each other, by enveloping said first spring portion in said sheath, and said sheath and said second spring portion associated with the other chamber are independent of each other, said second spring portion surrounding the sheath and working under extension.

5 Claims, 1 Drawing Sheet

TENSIONER FOR POWER TRANSMISSION BELT

BACKGROUND OF THE INVENTION

The invention relates to a tensioner for a power transmission belt.

The Applicant has already proposed, in FR-A-No. 2 597 565, a tensioning device for a power transmission belt comprising a return spring associated with the shaft of a tensioning roller with which the belt cooperates for controlling the displacement of said roller under the action of said spring which is coated with elastomer forming a sheath defining at least one variable volume chamber filled with a liquid, said chamber being closed at one of its ends by a valve device through which the liquid flows into or out of said chamber and which introduces an effect of damping the vibrations likely to arise in the belt.

Such a device, which ensures tensioning of the belt —a condition sine qua non for satisfactory operation of the power transmission system—further damps the vibrations generated in the belt, particularly those due to the cyclic irregularities of the drive system or to the shocks caused by starting up and/or stopping of the apparatus coupled to the driven shaft which the belt drives. The results obtained by means of such a tensioner are satisfactory but the valve device introduces an operating dissymmetry which causes a very great difference between the maximum dynamic pressures of the liquid at the inlet and outlet of said chamber. Thus, in the case of a tensioner with two chambers defined by the elastomer sheath and for a transmission belt driving a plurality of driven shafts from the crankshaft of a motor vehicle, truck or similar engine, the ratio of the maximum dynamic pressures is at the minimum about 10, if not more, the highest pressure being of the order of 40 bars, for example. The result is severe constructional requirements for the device which must withstand such pressures, not only in so far as the elastomer is concerned but also the spring used.

With this situation in mind, it is an object of the invention to provide a tensioner for a power transmission belt which, while delivering the same results as those of the known device, is nevertheless simpler to construct.

It is also an object of the invention to provide such a tensioner which, in addition, exhibits improved characteristics with respect to the known device, not only in so far as its endurance and resistance are concerned, but also the possibility of operating over a wide temperature range.

It is a further object of the invention to provide such a tensioner which, while being shorter in length than the known device, has however the same characteristics, thus providing a considerable advantage for use thereof in all fields of application where space is limited, for example in the automobile industry where the dimensions of the accessories under the engine bonnet must be as small as possible.

SUMMARY OF THE INVENTION

A tensioner for a power transmission belt in accordance with the invention comprising at least one return spring associated with the shaft of a tensioning roller with which the belt cooperates for controlling the displacement of said roller under the action of said spring, and two variable volume chambers each defined by an elastomer sheath, filled with a liquid and communicating with each other at one of their ends through a valve device through which the liquid flows into or out of said chambers and which introduces a damping effect of the vibrations likely to occur in the belt is characterized in that the sheath and a first spring portion associated with one of the chambers are fast with each other, by enveloping said first spring portion in said sheath, and in that the sheath and the second spring portion associated with the other chamber are independent of each other, said second spring portion surrounding the sheath and working under extension.

In one embodiment, the first spring portion and the second spring portion are formed by two separate zones of one and the same coil spring whose ends are fixed to two obturators of said chambers.

In another embodiment, the first spring portion and the second spring portion are formed by two separate coil springs.

In such an embodiment, the spring, independent of the sheath and working under extension, is advantageously a spring with jointing turns prestressed in its rest position.

Advantageously, the second spring portion of the independent spring which forms it surrounds the sheath with which it is associated while forming therewith a clearance for expansion of said sheath without causing an appreciable deformation of the elastomer intimately enveloping the first spring portion.

BRIEF DESCRIPTION OF THE DRAWINGS

Other features and advantages of the invention will be clear from the following description, given by way of example with reference to the accompanying drawings in which.

DESCRIPTION OF THE PREFERRED EMBODIMENTS

Figure 1:
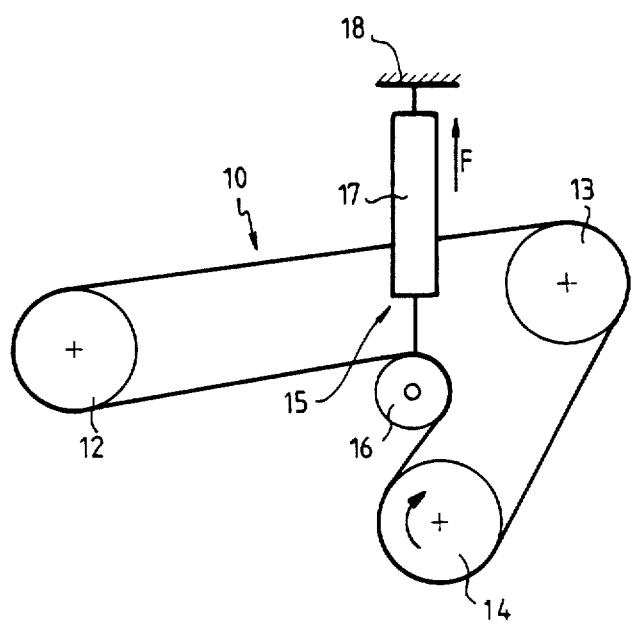
FIG. 1 is a very schematic view of a belt power transmission system.

Referring first of all to FIG. 1 which illustrates very schematically a power transmission system in which a belt 10 cooperates with the flanges of pulleys 12 and 13 fixed for rotation on driven shafts and with the flanges of a pulley 14 fixed on a drive shaft, for example the crankshaft of a motor vehicle, truck, agricultural machine, or similar engine. For tensioning belt 10, with the system are associated a tensioner 15 with roller 16 and spring damper 17 engaged at a point 18 with the engine, roller 16 being mounted for movement substantially in the direction of arrow F which is that of the axis of the spring. The damper tensioning device is intended to take up the stretch of belt 10 so as to avoid slipping thereof with respect to the flanges of the pulleys and to avoid resonance of the spring of the damper as well as damping the vibrations generated in the belt 10 by the cyclic irregularities of the engine speed, in particular when idling or at the time of shocks generated by the starting up and/or stopping of the apparatus driven by the shafts fast with pulleys 12 and 13.

Figure 2:
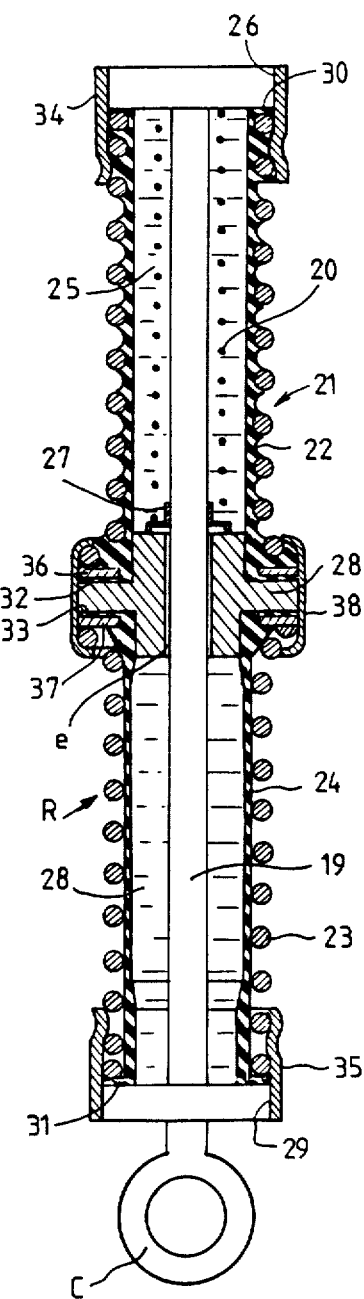
FIG. 2 is a schematic view of a tensioner in accordance with the invention.

In accordance with the invention, tensioner 15, FIG. 2, comprises a coil spring R a first part 21 of which is fast with an elastomer material sheath 22, e.g. made from nitrile rubber by enveloping this spring portion in the elastomer and a second portion 23 of which surrounds an elastomer sheath 24 but without being fast therewith. Sheath 22, which is cylindrical and sealed, defines a first liquid filled chamber 25, closed at one of its ends by an obturator 26 to which a rod 19 is secured, whereas the other end is closed by a valve device 27 on which is exerted the action of a spring 20 for closing an annular space e formed in a ring 48. The valve device 27 is provided for controlling the flow—advantageously dissymmetric—of the liquid between chamber 25 and a second chamber 28 communicating at one of the ends with space e and the other end of which is closed by an obturator 29 to which rod 19 and a hook or ring C are secured, for direct or indirect connection to roller 16.

For fixing sheaths 22 and 24 on obturators 26 and 29 and on the median ring 28, in accordance with the invention they are shaped at their ends as collars 30, 31, 32 and 33, the first two being clamped between obturators 26 and 29 and the end turns of the spring on which locking sleeves 34 and 35 respectively are engaged, whereas collars 32 and 33 are applied on shoulders of ring 28 by the end turns of the first and second spring portions, on which a sleeve 38 is crimped with interpositioning of metal washers 36 and 37 respectively.

The first and second spring portions may be formed by two separate zones of one and the same spring. In a variant, portions 21 and 23 are formed by two separate coil springs. In such a case, spring 23 which works under extension may be in the form of a spring with jointing turns prestressed in its rest position, such prestressing reducing the overall dimension of the tensioner while guaranteeing a satisfactory tension of belt 10.

Furthermore, the possibility of deformation of spring 23 independently of sheath 24 results in said sheath being deformed over the whole of its length, during the increase in volume of chamber 28, so that the work rate of the wall of the sheath is greatly reduced, by a factor at least equal to two with respect to that of the known device, thus increasing the resistance and endurance of the device of the invention.

This device exhibits, complementarily, an extremely reliable operation, since the possibility of relative displacement of spring 23 and sheath 24, i.e. the absence of adherence between the elastomer and the metal in the zone working under extension, introduces no tractive force between the elastomer and the metal, i.e. eliminates the risks of breakage and, therefore, a possible sealing defect.

To the advantages which have just been pointed out of the belt tensioner of the invention, is further added the fact that mounting with the possibility of movement of sheath 24 inside spring 23 makes possible, if said mounting is effected with sufficient play, deformation by expansion of the sheath, during a particularly appreciable temperature increase in the liquid volume formed by chambers 25 and 48.

Such a measure is advantageously used with a power transmission belt tensioner applied to a motor vehicle engine so that the clearance between spring 23 and sheath 24, at ambient temperature, is exactly compensated by the expansion of the liquid between the ambient temperature and the operating temperature, without causing any substantial deformation of the profile of the elastomer forming the sheath 22.

What is claimed is:

1. A tensioner for a power transmission belt comprising at least one return spring associated with a shaft of a tensioning roller with which the belt cooperates for controlling the displacement of said roller under the action of said spring, and two variable volume chambers each defined by an elastomer sheath filled with a liquid and communicating with each other at one of their ends through a valve device through which the liquid flows into or out of said chambers to introduce a damping effect of the vibrations likely to occur in the belt; wherein said sheath and a first spring portion associated with one of the chambers are fast with each other by enveloping said first spring portion in said sheath, and said sheath and said second spring portion associated with the other chamber are independent of each other, said second spring portion surrounding the sheath and working under extension.

2. The tensioner as claimed in claim 1, wherein said first spring portion and said second spring portion are formed by two separate zones of one and the same coil spring whose ends are fixed to two obturators of said chambers.

3. The tensioner as claimed in claim 1, wherein said first spring portion and said second spring portion are formed by two separate coil springs.

4. The tensioner as claimed in claim 3, wherein the spring, independent of the sheath and working under extension, is a spring with jointing turns prestressed in its rest condition.

5. The tensioner as claimed in claim 4, wherein the sheath associated with the spring forming said second spring portion or with said second spring portion is fitted with play inside said spring or said second spring portion.

* * * * *